US012270144B2

(12) United States Patent
Park et al.

(10) Patent No.: US 12,270,144 B2
(45) Date of Patent: Apr. 8, 2025

(54) CLOTHING MANAGEMENT APPARATUS

(71) Applicant: Samsung Electronics Co., Ltd., Suwon-si (KR)

(72) Inventors: Jooyeon Park, Suwon-si (KR); Dongwook Kim, Suwon-si (KR); Hoyoung Kim, Suwon-si (KR); Jayeon Seo, Suwon-si (KR); Jeongsu Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1159 days.

(21) Appl. No.: 16/963,913

(22) PCT Filed: Jan. 21, 2019

(86) PCT No.: PCT/KR2019/000818
§ 371 (c)(1),
(2) Date: Jul. 22, 2020

(87) PCT Pub. No.: WO2019/146971
PCT Pub. Date: Aug. 1, 2019

(65) Prior Publication Data
US 2021/0040675 A1    Feb. 11, 2021

(30) Foreign Application Priority Data
Jan. 23, 2018   (KR) .................. 10-2018-0008254

(51) Int. Cl.
D06F 58/20    (2006.01)
B01D 53/02    (2006.01)
(Continued)

(52) U.S. Cl.
CPC .......... D06F 58/203 (2013.01); B01D 53/02 (2013.01); B01D 53/30 (2013.01); D06F 58/20 (2013.01);
(Continued)

(58) Field of Classification Search
CPC ............ D06F 58/10–14; D06F 58/203; D06F 58/38–44; D06F 33/65; D06F 2105/32; D06F 2105/38–40
See application file for complete search history.

(56) References Cited

U.S. PATENT DOCUMENTS 4,941,270 A * 7/1990 Hoffman ............... D06F 58/203
34/604
5,369,892 A * 12/1994 Dhaemers ............... F26B 21/00
34/224

(Continued)

FOREIGN PATENT DOCUMENTS

CN    101310070 A * 11/2008 ............. D06F 58/10
CN    101381937 A *  3/2009 ............. D06F 58/04

(Continued)

OTHER PUBLICATIONS

International Search Report. PCT/ISA/210, dated May 14, 2019, in corresponding International Patent Application No. PCT/KR2019/000818.

(Continued)

Primary Examiner — Omair Chaudhri
(74) Attorney, Agent, or Firm — STAAS & HALSEY LLP

(57) ABSTRACT

A clothes-treating apparatus includes: a housing including an accommodating space to accommodate clothes therein; and a plurality of air conditioning modules provided inside the housing and different in an air conditioning function from each other, wherein each of the plurality of air conditioning modules is provided to be switched over between an exposing status in which the air conditioning function is activated and a blocking status in which the air conditioning function is inactivated, and a first air conditioning module among the plurality of air conditioning modules is in the exposing status while a second air conditioning module is in (Continued)

the blocking status. Thus, the clothes-treating apparatus prevents the air conditioning functions of the plurality of air conditioning modules from being offset by each other, thereby improving the effects of the air conditioning functions and extending the life of each air conditioning module.

11 Claims, 14 Drawing Sheets

(51) Int. Cl.
| | |
|---|---|
| B01D 53/30 | (2006.01) |
| D06F 58/10 | (2006.01) |
| D06F 58/44 | (2020.01) |
| D06F 58/46 | (2020.01) |
| D06F 105/32 | (2020.01) |
| D06F 105/38 | (2020.01) |
| D06F 105/40 | (2020.01) |
| D06F 103/02 | (2020.01) |
| D06F 103/28 | (2020.01) |
| D06F 103/38 | (2020.01) |

(52) U.S. Cl.
CPC ............ D06F 58/46 (2020.02); *D06F 58/10* (2013.01); *D06F 58/44* (2020.02); *D06F 2103/02* (2020.02); *D06F 2103/28* (2020.02); *D06F 2103/38* (2020.02); *D06F 2105/32* (2020.02); *D06F 2105/38* (2020.02); *D06F 2105/40* (2020.02)

(56) References Cited

U.S. PATENT DOCUMENTS

| | | | | |
|---|---|---|---|---|
| 2005/0262883 | A1* | 12/2005 | Yang | D06F 33/65 68/17 R |
| 2007/0169280 | A1* | 7/2007 | Kim | D06F 39/40 8/158 |
| 2008/0053163 | A1* | 3/2008 | Park | D06F 58/10 68/13 R |
| 2009/0241269 | A1* | 10/2009 | Yoo | D06F 73/02 8/149.3 |
| 2010/0018072 | A1* | 1/2010 | Kim | D06F 58/203 62/238.7 |
| 2010/0132209 | A1* | 6/2010 | Park | D06F 58/203 34/201 |
| 2011/0016930 | A1* | 1/2011 | Moon | D06F 58/203 68/5 C |
| 2012/0216814 | A1 | 8/2012 | Volo et al. | |
| 2013/0025154 | A1* | 1/2013 | Park | D06F 58/50 68/5 R |
| 2013/0047346 | A1* | 2/2013 | Im | D06F 33/32 8/137 |
| 2016/0175471 | A1* | 6/2016 | Choi | D06F 73/02 239/58 |
| 2018/0148876 | A1* | 5/2018 | Skrippek | D06F 58/203 |
| 2020/0080249 | A1* | 3/2020 | Lee | D06F 58/24 |
| 2020/0096210 | A1* | 3/2020 | Kim | F24F 13/28 |
| 2020/0370235 | A1* | 11/2020 | Kang | D06F 58/10 |
| 2020/0385915 | A1* | 12/2020 | Kang | D06F 58/20 |
| 2021/0054560 | A1* | 2/2021 | Kim | D06F 58/10 |
| 2021/0222350 | A1* | 7/2021 | Kang | D06F 58/10 |

FOREIGN PATENT DOCUMENTS

| | | | | |
|---|---|---|---|---|
| EP | 1441060 A1 * | 7/2004 | ........... | D06F 58/203 |
| JP | 4860079 B2 | 11/2011 | | |
| JP | 2016-220758 A | 12/2016 | | |
| JP | 2017-48965 A | 3/2017 | | |
| KR | 20-1996-0013403 | 5/1996 | | |
| KR | 19960013403 A * | 5/1996 | | |
| KR | 20-1997-0027111 | 7/1997 | | |
| KR | 19970027111 A * | 7/1997 | | |
| KR | 10-2005-0113317 | 12/2005 | | |
| KR | 10-2009-0017826 A | 2/2009 | | |
| KR | 10-0886390 B1 | 3/2009 | | |
| KR | 10-0905421 B1 | 6/2009 | | |
| KR | 10-2010-0018383 | 2/2010 | | |
| KR | 20110043250 A * | 4/2011 | | |
| KR | 20100094724 A * | 2/2012 | | |
| KR | 10-2013-0015240 A | 2/2013 | | |
| KR | 200472951 Y1 * | 5/2014 | | |
| KR | 10-1597111 B1 | 2/2016 | | |
| KR | 20180097326 A * | 8/2018 | | |
| WO | WO-2010109794 A1 * | 9/2010 | ............ | A61L 2/22 |
| WO | WO-2017157196 A1 * | 9/2017 | ............ | D06F 25/00 |

OTHER PUBLICATIONS

Office Action dated Aug. 12, 2022 issued in Korean Application No. 10-2018-0008254.

* cited by examiner

CLOTHING MANAGEMENT APPARATUS

CROSS-REFERENCE TO RELATED APPLICATIONS

This application is a U.S. National Stage Application which claims the benefit under 35 U.S.C. § 371 of International Patent Application No. PCT/KR2019/000818 filed on Jan. 21, 2019, which claims foreign priority benefit under 35 U.S.C. § 119 of Korean Patent Application 10-2018-0008254 filed on Jan. 23, 2018, in the Korean Intellectual Property Office, the contents of both of which are incorporated herein by reference.

TECHNICAL FIELD

The disclosure relates to a clothes-treating apparatus for processing or treating clothes put in a cabinet or a chamber based on a predetermined function, and more particularly to a clothes-treating apparatus having a structure for performing treatment based on deodorizing, perfuming, and the like preset air conditioning functions with regard to clothes.

BACKGROUND ART

Household appliances refer to electronic apparatuses to be used by a user to receive a lot of help for daily life at home, and may be realized by various kinds of apparatuses according to subjects to be treated and treatment methods. Among the household appliances, an appliance of which subjects to be processed are clothes is typically called a clothes-handling apparatus or a clothes-treating apparatus, and the clothes-treating apparatus may be classified into various kinds of apparatuses according to specialized functions. For example, a washing machine among the clothes-treating apparatus is optimized to a function of washing clothes, and a drying machine is optimized to a function of drying clothes. Further, there is an apparatus, which is optimized to storage and maintenance of clothes, among the clothes-treating apparatus.

The clothes-treating apparatus for maintenance of clothes controls the status of the clothes so that a user can have a feeling of comfortable and new clothes. For example, the clothes-treating apparatus supplies steam to a chamber in which clothes are put, and thus smoothes out wrinkles of clothes by the steam without directly applying heat to the clothes. Further, the clothes-treating apparatus may dust off the clothes by steam. Alternatively, the clothes-treating apparatus may keep the dried status of the clothes by supplying hot air having a predetermined temperature or higher to the chamber.

Such a clothes-treating apparatus may treat the clothes based on an air conditioning function to refresh the status of the clothes. The air conditioning function refers to a function for adjusting condition of air in the chamber to control the status of the clothes in the chamber, and may for example include a deodorizing function for removing unpleasant smells from the clothes, a perfuming function for adding a predetermined scent to the clothes, etc. A conventional clothes-treating apparatus includes one of a deodorizing module for performing the deodorizing function and a perfuming module for performing the perfuming function or both of the two modules, and uses the module to adjust condition of air in the chamber, thereby refreshing the status of the clothes.

However, in the clothes-treating apparatus including only the deodorizing module, deodorization is not completely performed by the deodorizing module and unpleasant smells may remain on the clothes. In the clothes-treating apparatus including only the perfuming module, aromatic components of the perfuming module may be mixed with unpleasant smells of the clothes when the unpleasant smells are strong, thereby causing another offensive smell. In the clothes-treating apparatus including both the deodorizing module and the perfuming module, the aromatic components from the perfuming module are adsorbed to the deodorizing module, thereby lowering both the deodorizing function and the perfuming effect. Further, in this case, the life of the deodorizing module to which the aromatic components are adsorbed may be reduced.

Accordingly, in the clothes-treating apparatus employing a plurality of modules for deodorizing, perfuming and the like specialized air conditioning functions, it may be important to have a structure or method for preventing performance of treating clothes from being lowered as the effects of the modules are offset by each other.

Technical Solution

A clothes-treating apparatus according to an embodiment of the disclosure may include: a housing including an accommodating space to accommodate clothes therein; and a plurality of air conditioning modules provided inside the housing and different in an air conditioning function from each other, wherein each of the plurality of air conditioning modules is provided to be switched over between an exposing status in which the air conditioning function is activated and a blocking status in which the air conditioning function is inactivated, and a first air conditioning module among the plurality of air conditioning modules is in the exposing status while a second air conditioning module is in the blocking status. Thus, the clothes-treating apparatus prevents the air conditioning functions of the plurality of air conditioning modules from being offset by each other, thereby improving the effects of the air conditioning functions and extending the life of each air conditioning module.

Here, the clothes-treating apparatus may further include: a cover disposed on the plurality of air conditioning modules; a driver configured to drive the plurality of air conditioning modules to move; and a controller configured to control the driver to switch each of the plurality of air conditioning modules over between the exposing status and the blocking status based on the cover.

Here, the clothes-treating apparatus may further include: a channel provided in the housing to introduce or discharge air into or from the accommodating space, wherein the plurality of air conditioning modules is disposed on the channel in the exposing status.

Further, the clothes-treating apparatus may further include a sensor configured to detect odor concentration inside the accommodating space, wherein the controller controls one among the plurality of air conditioning modules to be in the blocking status based on whether the odor concentration detected by the sensor is higher than a threshold.

Further, the clothes-treating apparatus may further include a timer configured to measure time, wherein the controller controls one among the plurality of air conditioning modules to be in the blocking status based on whether the time measured by the timer has reached a preset time.

Further, the controller may control the plurality of air conditioning modules to move between a first position, a second position and a third position, and the first air conditioning module may be in the exposing status at the first position, the second air conditioning module may be in the exposing status at the second position, and the first air conditioning module and the second air conditioning module may be all in the blocking status at the third position.

Further, each air conditioning module includes: a module main body configured to perform an air conditioning function, and a module cover coupled to the module main body and movable between an opening opposition to open the module main body and a closing position to close the module main body, and the controller may be configured to move the module cover to the opening position in the exposing status, and move the module cover to the closing position in the blocking status.

Here, the air conditioning module may be disposed on a channel through which air moves, and the module cover may guide air to pass through the module main body by interfering with the channel in the opening position, and guide air to move along the channel by releasing the interference with the channel in the closing position.

Further, the housing may include an inlet to introduce air into the accommodating space, and an outlet to discharge air from the accommodating space, the plurality of air conditioning modules may include a deodorizing module to perform a deodorizing function, and a perfuming module to perform a perfuming function, and the deodorizing module may be disposed on the inlet in the exposing status, and the perfuming module is disposed on the outlet in the exposing status.

Further, the clothes-treating apparatus may further include: a cover disposed on the plurality of air conditioning modules; a driver configured to drive the cover to move; and a controller configured to control the driver to drive each of the plurality of air conditioning modules to be switched over between the exposing status and the blocking status based on the cover.

Further, the clothes-treating apparatus may further include: a rotary shaft to which the plurality of air conditioning modules is coupled; a driver configured to drive the rotary shaft to rotate; and a controller configured to control the driver to drive one among the plurality of air conditioning modules to be selectively disposed on a moving path of air.

Further, the plurality of air conditioning modules may include a deodorizing module to perform a deodorizing function and a perfuming module to perform a perfuming function, and the clothes-treating apparatus may further include: a sensor configured to detect odor concentration inside the accommodating space; and a controller configured to control the deodorizing module to be in the exposing status and the perfuming module to be in the blocking status based on the odor concentration higher than a threshold.

Here, the clothes-treating apparatus may further include a steam supplier configured to supply steam to the accommodating space, wherein the controller is configured to control the deodorizing module and the perfuming module to be all in the blocking status while the steam supplier is supplying steam.

Further, an air conditioner according to an embodiment of the disclosure includes: a housing; and a plurality of air conditioning modules provided on an air channel inside the housing and different in an air conditioning function from each other, wherein each of the plurality of air conditioning modules is provided to be switched over between an exposing status in which the air conditioning function is activated and a blocking status in which the air conditioning function is inactivated, and a first air conditioning module among the plurality of air conditioning modules is in the exposing status while a second air conditioning module is in the blocking status.

BEST MODE

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
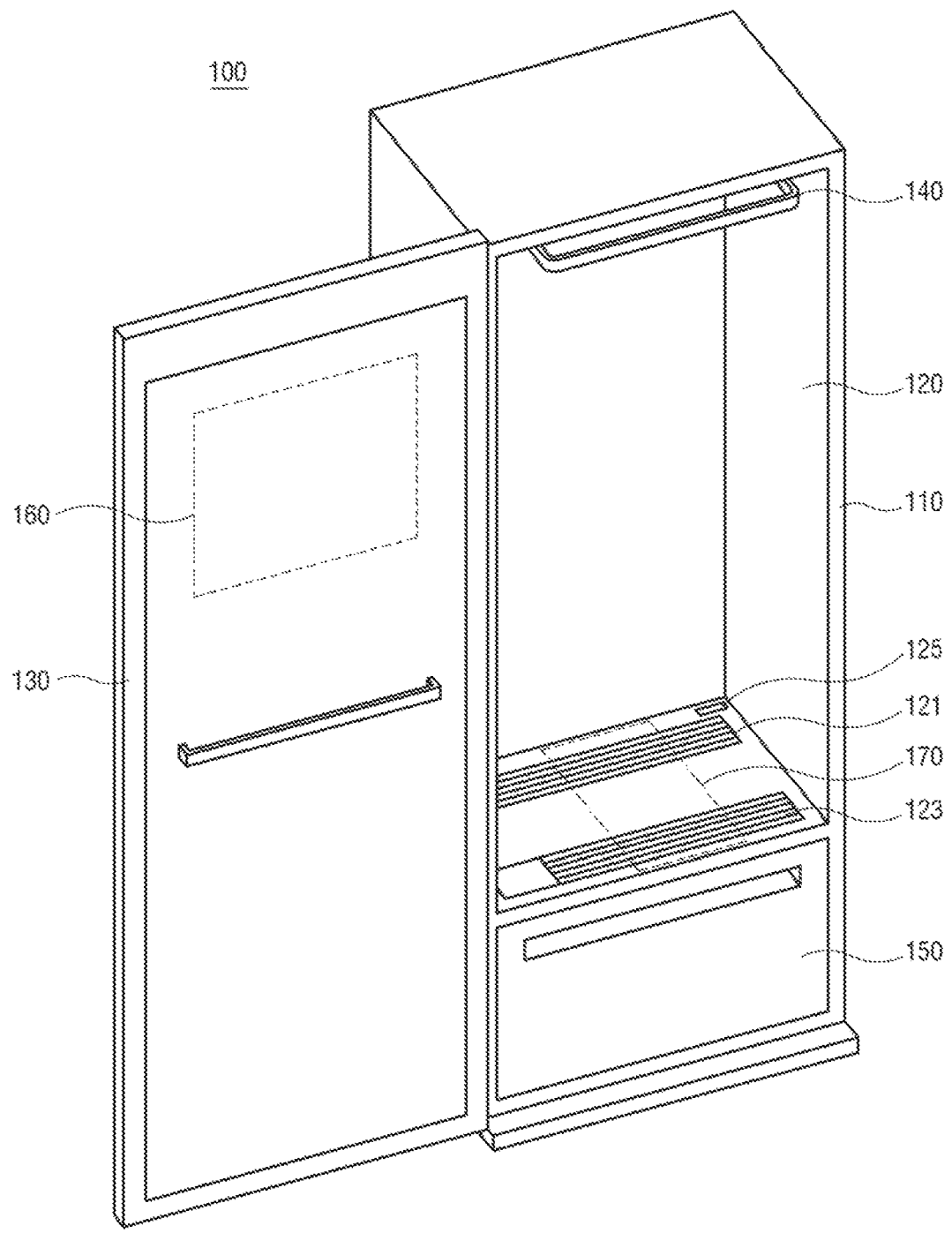
FIG. 1 is a perspective view of a clothes-treating apparatus according to an embodiment of the disclosure.

FIG. 1 is a perspective view of a clothes-treating apparatus according to an embodiment of the disclosure.

As shown in FIG. 1, a clothes-treating apparatus 100 according to an embodiment of the disclosure is embodied by an apparatus for implementing a function of refreshing a status of clothes. Here, the refresh function specifically refers to processes of smoothing out wrinkles, removing smells, carrying out sterilization, removing static electricity, heating, drying, perfuming, etc. by applying air, water, etc. to the clothes. The clothes-treating apparatus 100 may apply air, water, etc. in the form of cool air, hot air, mist, steam, etc. The structure of the clothes-treating apparatus 100 to be described below is merely an example in which the concept of the disclosure is embodied, and the structure or shape of the clothes-treating apparatus 100 may be varied depending on design methods.

The clothes-treating apparatus 100 includes a housing 110 forming an outer appearance of the clothes-treating apparatus 100, a chamber 120 inside the housing 110, a door 130 coupled to the housing 110 to open and close the chamber 120, a hanger 140 placed at an upper side of the chamber 120, and provided to hang a piece of clothing thereon, a machinery room 150 placed at a lower side of the chamber 120 and selectively supplying air and steam to the chamber 120 according to treatment processes, a user input receiver 160 placed on an outer side of the door 130 and allowing a user to direct operations of the clothes-treating apparatus 100, and an air conditioning unit 170 placed at a lower side of the chamber 120 and provided to control condition of air inside the chamber 120.

The chamber 120 forms a room provided to put clothes inside the housing 110. The chamber 120 is opened frontward, and the door 130 is pivotally coupled to the housing 110 to open or close the front of the chamber 120. The chamber 120 forms a room approximately shaped like a vertically long hexahedron, and is provided with the machinery room 150 at the lower side thereof, and the hanger 140 at the upper side thereof. On the lower plate of the chamber 120, i.e. the upper plate of the machinery room 150, an air inlet 121 is formed to introduce air into the chamber 120, an air outlet 123 is formed to discharge air from the chamber 120, and a steam inlet 125 is formed to introduce steam into the chamber 120.

The hanger 140 includes a hanger bar on which a clothes hanger for the hanging of clothes is hung. Alternatively, the hanger bar is designed to turn around so that air or steam ascending from the lower side of the chamber 120 can be uniformly applied to clothes. In this case, the hanger 140 may include a motor and a rotary structure for turning the hanger bar at the upper side of the chamber 120.

The machinery room 150 includes an air supplier for supplying air or a steam supplier for supplying steam. The steam supplier includes a water tank to store water, and this water tank is provided to be separable through the front of the machinery room 150 so that a user can fill the water tank with water. The machinery room 150 is placed at the lower side of the chamber 120. This is because the air or steam supplied from the machinery room 150 to the chamber 120 has property of ascending. The air or steam discharged from the lower side of the chamber 120 ascends to be in contact with the clothes hung on the upper side of the chamber 120, and descends after the contact with the clothes.

Air introduced from the machinery room 150 into the chamber 120 through the air inlet 121 ascends to be in contact with the clothes, and then descends to be discharged from the chamber 120 to the machinery room 150 through the air outlet 123. The air discharged to the machinery room 150 is introduced again into the air inlet 121, and continuously circulated between the chamber 120 and the machinery room 150, thereby controlling the status of the clothes. In this case, the machinery room 150 selectively generates steam while controlling temperature of air to adjust the temperature and humidity inside the chamber 120, thereby controlling the status of the clothes.

The user input receiver 160 includes an input unit that allows a user to input directions for controlling the operations of the clothes-treating apparatus 100, and a display that displays the status of the clothes-treating apparatus 100.

The air conditioning unit 170 controls condition of air in the chamber 120 based on a predetermined air conditioning function, thereby controlling the status of the clothes inside the chamber 120. In other words, there are many air conditioning functions controllable by the air conditioning unit 170, for example a deodorizing function, a sterilization function, a dust-removing function, a perfuming function, etc. The air conditioning unit 170 is installed at least one of the air inlet 121 and the air outlet 123 in the lower side of the chamber 120, to thereby easily control condition of air circulating inside the chamber 120.

According to an embodiment, the air conditioning unit 170 includes a plurality of air conditioning modules different in the air conditioning function from each other. Here, each of the plurality of air conditioning modules is provided to alternate between an exposing status in which the air conditioning function is activated and a blocking status in which the air conditioning function is inactivated. While the first air conditioning module of the plurality of air conditioning modules is in the exposing status, the second air conditioning module is in the blocking status.

Thus, the air conditioning functionality of the air conditioning unit 170 is maximized while the life of the air conditioning unit 170 is relatively extended.

Below, the structure of the air conditioning unit 170 will be described.

Figure 2:
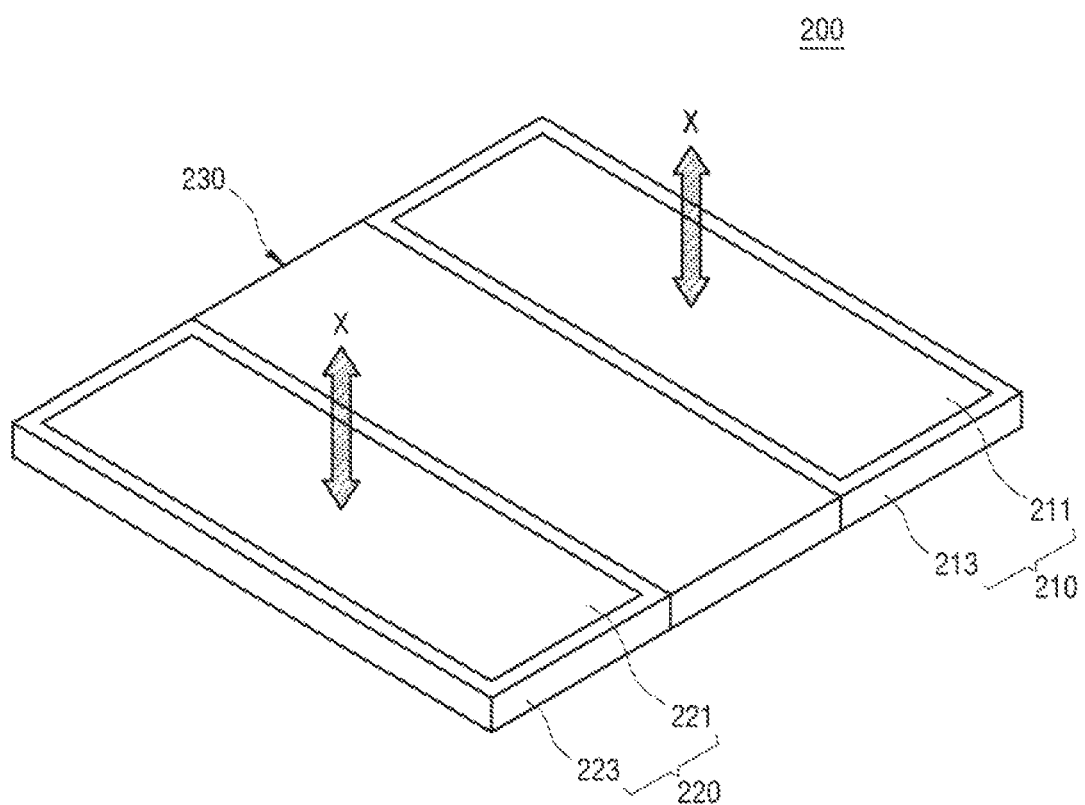
FIG. 2 is a perspective view of an air conditioning unit applied to a clothes-treating apparatus according to an embodiment of the disclosure.

FIG. 2 is a perspective view of an air conditioning unit applied to a clothes-treating apparatus according to an embodiment of the disclosure.

As shown in FIG. 2, an air conditioning unit 200 includes a first module 210 having a first air conditioning function, and a second module 220 having a second air conditioning function. Here, the first air conditioning function and the second air conditioning function are different in the air conditioning function from each other. The first module 210 and the second module 220 are shaped like a quadrangular plate and arranged side by side, so that the air conditioning unit 200 can be generally shaped like a quadrangular plate.

In this embodiment, a support plate 230 for coupling and supporting the first module 210 and the second module 220 is provided between the first module 210 and the second module 220. However, the structure of the air conditioning unit 200 is not limited to this embodiment. Alternatively, the first module 210 and the second module 220 may be designed to be directly connected without the support plate 230. Because the support plate 230 is interposed between the first module 210 and the second module 220, the air conditioning unit 200 can relatively reduce a moving distance. The movement of the air conditioning unit 200 will be described later.

In this embodiment, it will be described on the assumption that the first module 210 is a perfuming module having a perfuming function, and the second module 220 is a deodorizing module having a deodorizing function. However, such an embodiment is merely one among various examples of the first module 210 and the second module 220, and therefore this embodiment does not limit the concept of the disclosure.

The first module 210 includes a first module main body 211 for performing the perfuming function, and a first module frame 213 surrounding and supporting the first module main body 211. The first module 210 is detachably provided in the support plate 230, and freely replaceable in the air conditioning unit 200.

The first module main body 211 is provided to allow air to pass therethrough in at least an X direction, i.e. at least a direction normal to the plate. The first module main body 211 emits predetermined aromatic molecules to air circulating inside the chamber, so that the aromatic molecules can be in contact with clothes, thereby performing the perfuming function.

The second module 220 includes a second module main body 221 for performing the deodorizing function, and a second module frame 223 surrounding and supporting the second module main body 221. The second module 220 is detachably provided in the support plate 230, and freely replaceable in the air conditioning unit 200.

The second module main body 221 is provided to allow air to pass therethrough in at least the X direction. The second module main body 221 performs a deodorizing and filtering function for deodorizing air passing therethrough. For this function, the second module main body 221 may include various materials such as activated carbon, etc. The second module main body 221 adsorbs odor molecules included in air passing therethrough, thereby reducing unpleasant smells in air circulating in the chamber.

The air conditioning unit 200 is provided to move a predetermined distance in the chamber. Further, the air conditioning unit 200 may be movable by a user, or may be automatically movable according to preset conditions. Further, there may be various conditions under which the air conditioning unit 200 moves, and detailed descriptions in this regard will be made later.

Below, a structure of selectively exposing or blocking the first module 210 and the second module 220 of the air conditioning unit 200 will be described.

Figure 3:
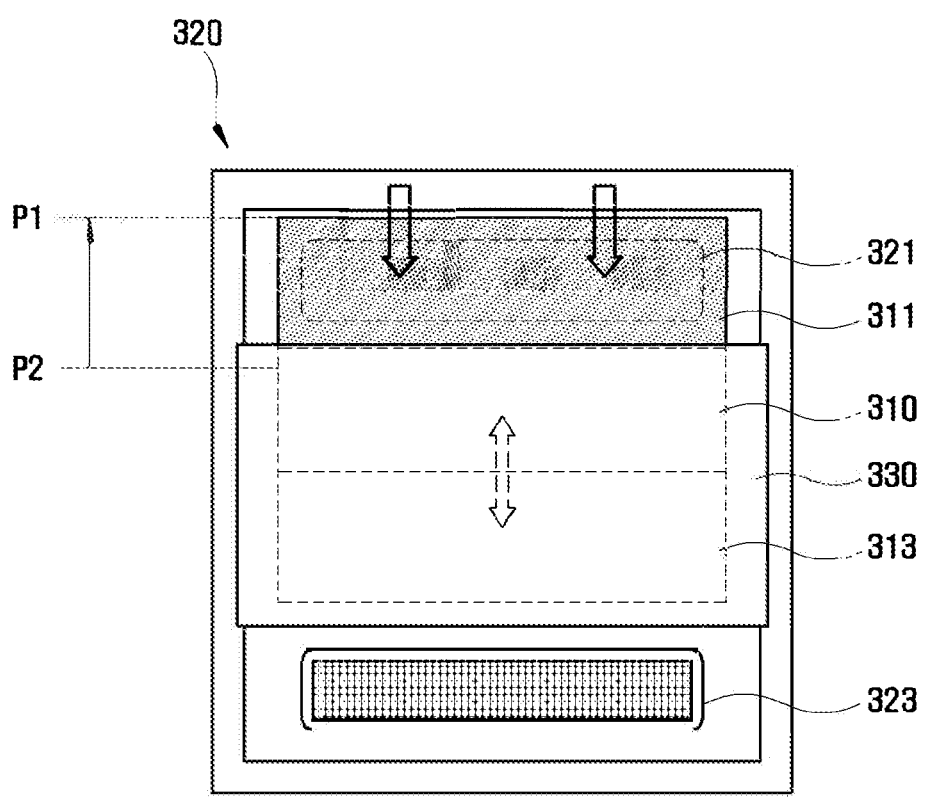
FIG. 3 is a plane view showing that an air conditioning unit is in a first position in a clothes-treating apparatus according to an embodiment of the disclosure.

FIG. 3 is a plane view showing that an air conditioning unit is in a first position in a clothes-treating apparatus according to an embodiment of the disclosure.

As shown in FIG. 3, an air conditioning unit 310 includes a first module 311 and a second module 313. On a lower plate of a chamber 320, an air inlet 321 for introducing air into the chamber 320 and an air outlet 323 for discharging air from the and the chamber 320 are arranged to be spaced apart from each other. A cover 330 is provided between the air inlet 321 and the air outlet 323. Between the lower plate of the chamber 320 and the cover 330, the air conditioning unit 310 is movably provided.

The cover 330 blocks at least a certain area of the air conditioning unit 310 not to be exposed. One of the first module 311 and the second module 313 not blocked by the cover 330 but exposed can perform the air conditioning function of the corresponding module, and the other one of the first module 311 and the second module 313 blocked by the cover 330 cannot perform the air conditioning function of the corresponding module.

The air conditioning unit 310 is movable between a first position P1 and a second position P2. When the air conditioning unit 310 is in the first position P1, the first module 311 has an exposed status and the second module 313 has a blocked status.

When the air conditioning unit 310 is in the first position P1, the first module 311 is disposed on the air inlet 321 and the second module 313 is covered by the cover 330. In this case, air introduced from the air inlet 321 is supplied to the chamber 320 while passing through the first module 311. When the first module 311 is in the perfuming module, air from the first module 311 is blown with aromatic components to clothes, so that the clothes can be performed.

Meanwhile, the second module 313 is not disposed on the air outlet 323 while the second module 313 is in a position being blocked by the cover 330. While the first module 311 performs its air conditioning function, the air conditioning function of the second module 313 is not performed. In a case where the second module 313 is a deodorizing module, aromatic components from the first module 311 are not adsorbed to the second module 313 because the second module 313 is covered with the cover 330. This means that the life of the second module 313 is prevented from being shortened by the aromatic components of the first module 311.

Below, it will be described that the air conditioning unit 310 moves to the second position P2.

Figure 4:
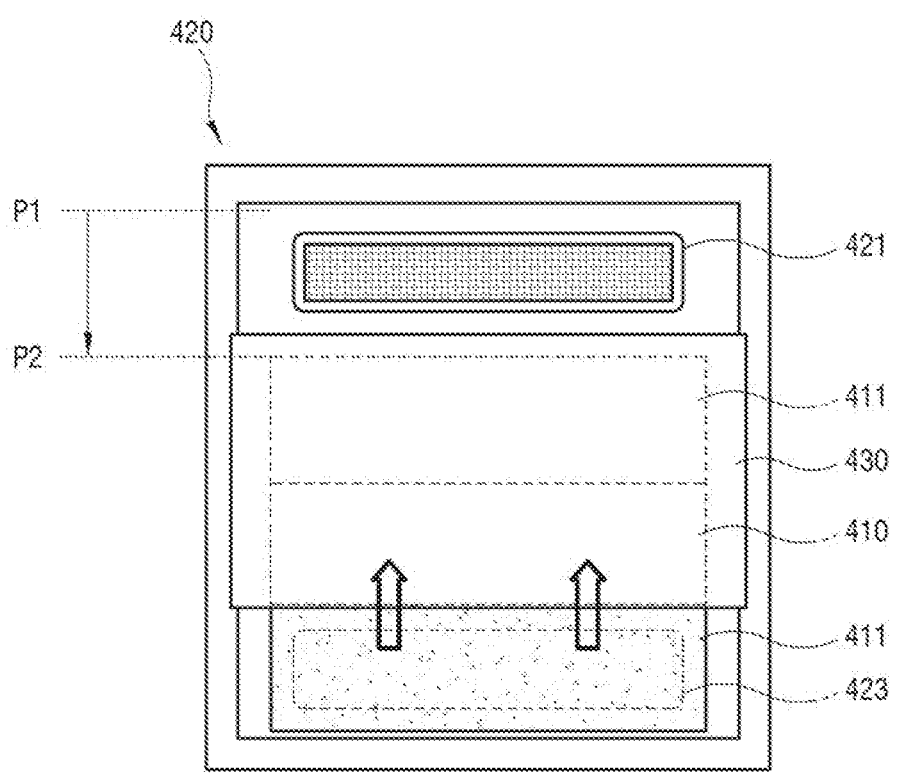
FIG. 4 is a plane view showing that an air conditioning unit is in a second position in a clothes-treating apparatus according to an embodiment of the disclosure.

FIG. 4 is a plane view showing that an air conditioning unit is in a second position in a clothes-treating apparatus according to an embodiment of the disclosure.

As shown in FIG. 4, an air conditioning unit 410 includes a first module 411 and a second module 413. On a lower plate of a chamber 420, an air inlet 421 for introducing air into the chamber 420 and an air outlet 423 for discharging air from the chamber 420 are arranged to be spaced apart from each other. Between the air inlet 421 and the air outlet 423, a cover 430 is provided.

When the air conditioning unit 410 moves from a first position P1 to a second position P2, the first module 411 has a blocked status and the second module 413 has an exposed status.

The first module 411 moves from the position on the air inlet 421 to a position blocked by the cover 430. Because of the cover 430, the perfuming function of the first module 411 is not performed. Meanwhile, the second module 413 moves from the position blocked by the cover 430 to the position on the air outlet 423. Odor components included in air passing through the second module 413 are adsorbed to the second module 413, and thus air is deodorized. In this case, the first module 411 is blocked, and therefore the aromatic components of the first module 411 are not adsorbed to the second module 413.

Like this, the air conditioning unit 410 according to an embodiment exposes the first module 411 and blocks the second module 413 in the first position P1, but blocks the first module 411 and exposes the second module 413 in the second position P2. According to an embodiment, both the first module 411 and the second module 413 are not all exposed, but one is blocked while the other is exposed. Thus, the air conditioning function of the first module 411 and the air conditioning function of the second module 413 are not offset by each other, thereby preventing air conditioning effects from being lowered and preventing the life of the first module 411 or the second module 413 from being shortened.

The air conditioning unit 410 may be moved by a user, or may be automatically moved without a user's input when a specific condition is satisfied. Below, the structure for moving the air conditioning unit 410 will be described.

Figure 5:
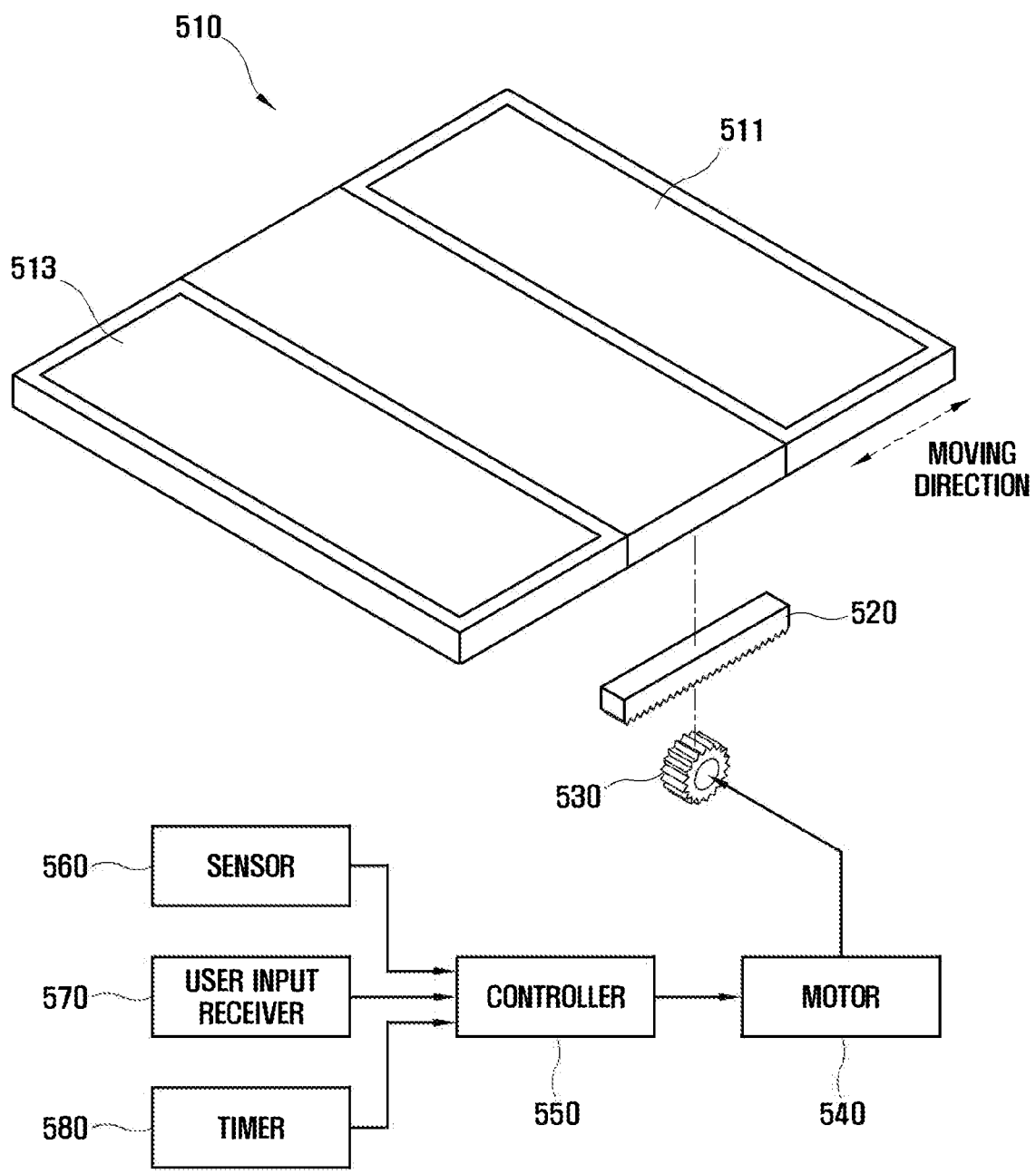
FIG. 5 illustrates a structure for moving an air conditioning unit in a clothes-treating apparatus according to an embodiment of the disclosure.

FIG. 5 illustrates a structure for moving an air conditioning unit in a clothes-treating apparatus according to an embodiment of the disclosure.

As shown in FIG. 5, an air conditioning unit 510 includes a first module 511 and a second module 513. The air conditioning unit 510 may be movable with various structures, and therefore the following movable structure is merely an example and does not limit an embodiment of the disclosure to one embodiment.

The movable structure of the air conditioning unit 510 for example includes a rack 520 coupled to the bottom of the air conditioning unit 510 and extended in parallel with a moving direction of the air conditioning unit 510, a pinion 530 engaged with the rack 520, and a motor 540 driving the pinion 530 to rotate forward and backward. The position of the air conditioning unit 510, to which the rack 520 is coupled, is not restricted, but may correspond to the bottom of the first module 511 or the second module 513. However, when the first module 511 and the second module 513 are replaceable, the rack 520 may be coupled to the bottom of a support plate 515 to which the first module 511 and the second module 513 are detachably provided.

In this embodiment, one rack 520 and one pinion 530 form a pair. However, a plurality of racks 520 and pinions 530 may be paired together. When the plurality of pairs of racks 520 and pinions 530 are provided, a link for transferring the driving power of the motor 540 may be provided between the pairs.

The pinion 530 may be directly connected to the rotary shaft of the motor 540, or various link structures such as a gear, rotary shaft, etc. may be interposed between the rotary shaft of the motor 540 and the pinion 530. The motor 540 is driven based on a control signal of a controller 550 to rotate the pinion 530. The forward rotation of the pinion 530 causes the rack 520 to move in a predetermined first direction, and the backward rotation of the pinion 530 causes the rack 520 to move in a second direction opposite to the first direction.

The controller 550 is embodied by a control circuit including a chipset, a central processing unit (CPU), a system on chip (SoC), a microcontroller, a processor, a memory, a buffer, etc. When it is detected that a preset event occurs, the controller 550 transmits a control signal corresponding to the detected event to the motor 540. The control signal may be given as voltage having a preset level, or an electric signal distinguishable between high or low values, and there are no limits of the form of the control signal.

The event detected by the controller 550 is generated by various methods. The controller 550 identifies that the event occurs when a predetermined detection result is received from a sensor 560 for sensing various air conditions inside the chamber, when a user input is received from a user input receiver 570, or when a timer 580 measures that a predetermined period of time elapses. According to which conditions the sensor 560 will detect, the controller 550 may control the air conditioning unit 510 to move under various conditions.

Below, it will be described in detail that the statuses of the first module 511 and the second module 513 are changed as the air conditioning unit 510 is moved based on a preset condition.

Figure 6:
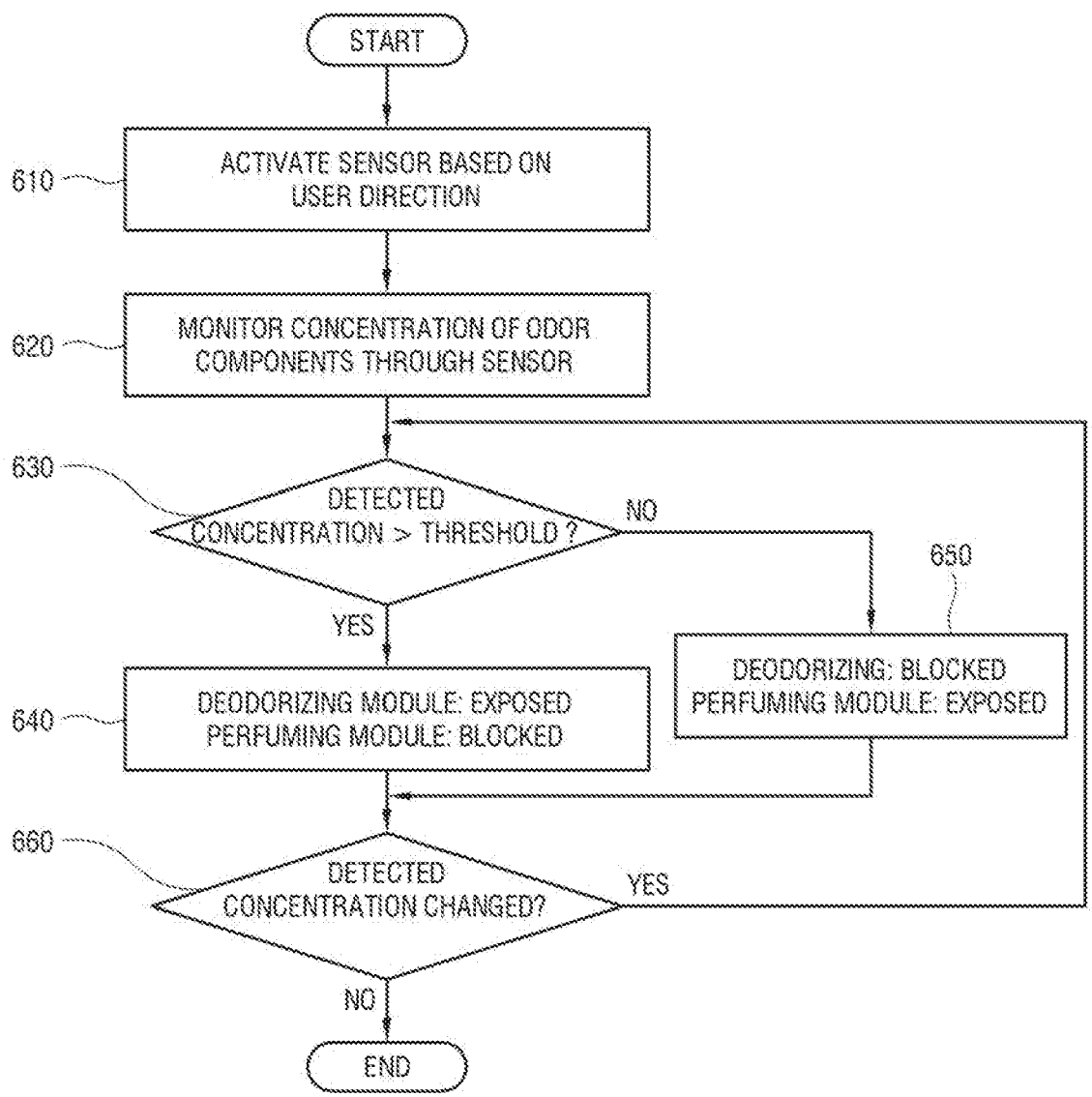
FIG. 6 is a flowchart of a method by which a clothes-treating apparatus according to an embodiment of the disclosure controls a state of an air conditioning unit based on detection results of a sensor.

FIG. 6 is a flowchart of a method by which a clothes-treating apparatus according to an embodiment of the disclosure controls a state of an air conditioning unit based on detection results of a sensor.

As shown in FIG. 6, the following operations are performed by the controller of the clothes-treating apparatus.

At operation 610 the clothes-treating apparatus activates the sensor in response to a user's direction. For example, the clothes-treating apparatus inactivates the sensor while there are no clothes in the chamber, but activates the sensor to detect odor components when a user puts clothes in the chamber and inputs a predetermined direction. Of course, the sensor may be designed to operate without a user's specific direction.

At operation 620 the clothes-treating apparatus monitors concentration of odor components through the sensor. In this embodiment, the sensor is employed to detect odor components, but sensors for detecting various components as well as the odor components may be employed according to design methods.

At operation 630 the clothes-treating apparatus identifies whether the concentration detected by the sensor is higher than a threshold.

When it is identified that the detected concentration is higher than the threshold, at operation 640 the clothes-treating apparatus exposes the deodorizing module but blocks the perfuming module.

On the other hand, when it is detected that the detected concentration is not higher than the threshold, at operation 650 the clothes-treating apparatus blocks the deodorizing module but exposes the perfuming module.

At operation 660 the clothes-treating apparatus identifies whether the concentration detected by the sensor is changed. The sensor periodically performs detection in units of a predetermined period of time, and therefore the clothes-treating apparatus identifies whether the concentration is substantially changed or not based on the detection results periodically received from the sensor.

When it is identified that the detected concentration is not changed, the clothes-treating apparatus maintains the current status. On the other hand, when it is identified that the detected concentration is changed, the clothes-treating apparatus moves to the operation 630.

Thus, the clothes-treating apparatus may automatically control each of the first module and the second module to be exposed or blocked based on the air conditions of the chamber.

Figure 7:
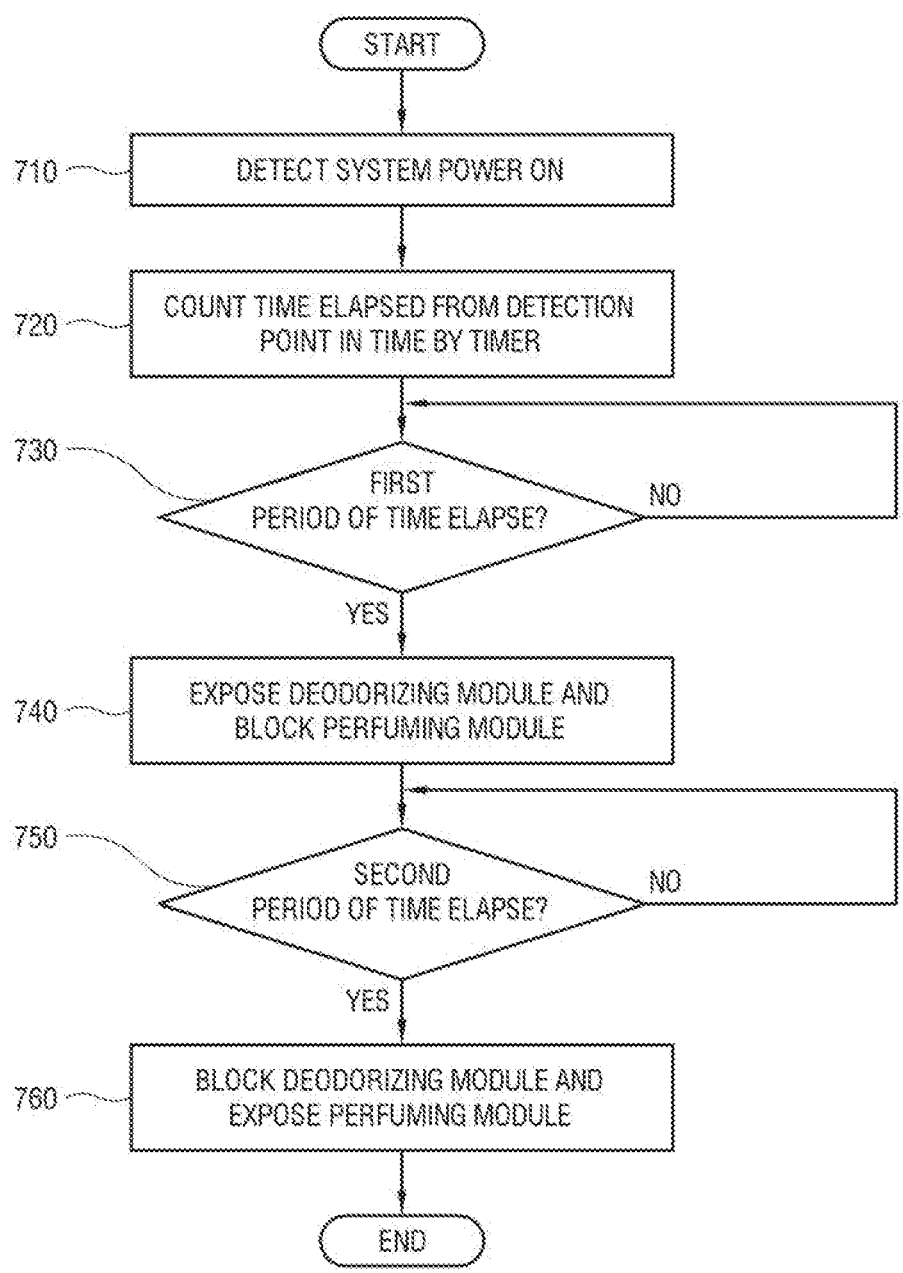
FIG. 7 is a flowchart of a method by which a clothes-treating apparatus according to an embodiment of the disclosure controls a state of an air conditioning unit based on time-measurement results of a timer.

FIG. 7 is a flowchart of a method by which a clothes-treating apparatus according to an embodiment of the disclosure controls a state of an air conditioning unit based on time-measurement results of a timer.

As shown in FIG. 7, the following operations are performed by the controller of the clothes-treating apparatus.

At operation 710 the clothes-treating apparatus detects whether a system power is turned on.

At operation 720 the clothes-treating apparatus measures that time elapses from a point in time when it is detected that the system power is turned on, based on the timer.

At operation 730 the clothes-treating apparatus identifies whether a first period of time elapses after the system power is turned on. When the first period of time does not elapse yet, the clothes-treating apparatus continues to monitor the elapsed time.

When it is identified that the first period of time elapses after the system power is turned on, at operation 740 the clothes-treating apparatus exposes the deodorizing module and blocks the perfuming module.

At operation 750 the clothes-treating apparatus identifies whether a second period of time elapses after the system power is turned on. When the second period of time does not elapse yet, the clothes-treating apparatus continues to monitor the elapsed time. Here, the second period of time is longer than the first period of time.

When it is identified that the second period of time elapses after the system power is turned on, at operation 760 the clothes-treating apparatus blocks the deodorizing module and exposes the perfuming module.

A scenario of when the foregoing operations are performed will be described in detail. When a user puts clothes in the chamber and turns on the system power, the clothes-treating apparatus first generates steam to increase the amount of contained water. When the first period of time elapses after the system power is turned on, the clothes-treating apparatus stops generating the steam. The clothes-treating apparatus exposes the deodorizing module when the operation based on the steam is completed, thereby deodorizing the clothes. Then, the clothes-treating apparatus blocks the deodorizing module and exposes the perfuming module when the second period of time elapses after the system power is turned on, thereby perfuming the clothes.

Thus, the clothes-treating apparatus may automatically control the first module and the second module to be exposed or blocked based on the measured time of the timer.

Meanwhile, the foregoing embodiment shows a structure that the air conditioning unit includes the first module and the second module, and one of the first module and the second module is necessarily blocked while the other one is exposed. However, the concept of the disclosure is not limited to this embodiment. For example, the clothes-treating apparatus may be designed to be switched over among a status that the first module is exposed and the second module is blocked, a status that the first module is blocked and the second module is exposed, and a status that both the first module and the second module are all blocked. Below, such an embodiment will be described.

Figure 8:
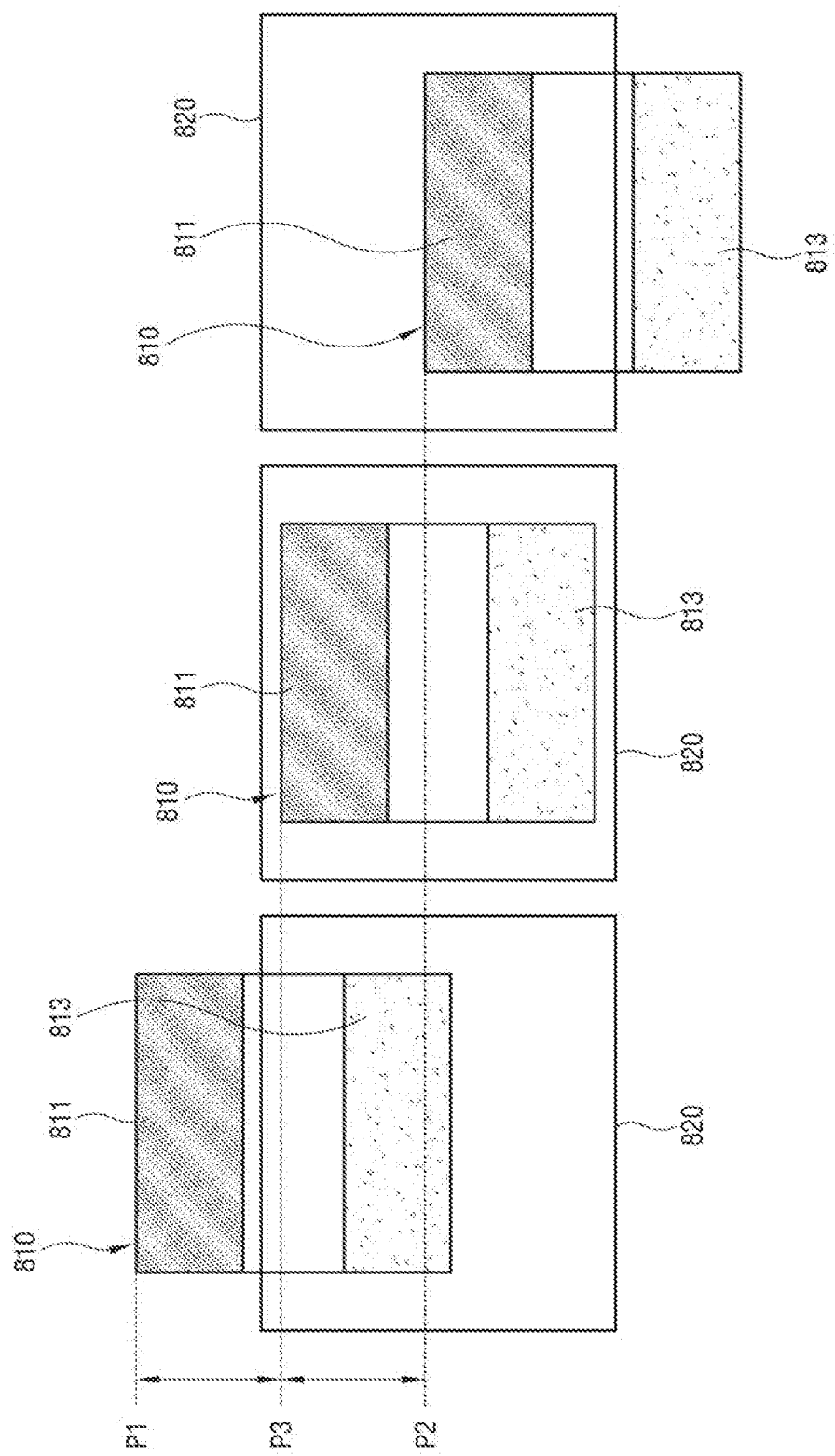
FIG. 8 is a plan view showing exposing and blocking forms of a module in three statuses of an air conditioning unit applied to a clothes-treating apparatus according to an embodiment of the disclosure.

FIG. 8 is a plan view showing exposing and blocking forms of a module in three statuses of an air conditioning unit applied to a clothes-treating apparatus according to an embodiment of the disclosure.

As shown in FIG. 8, an air conditioning unit 810 includes a first module 811 and a second module 813. The air conditioning unit 810 is provided to be movable between a first position P1, a second position P2 and a third position P3, and at least partially covered with a cover 820.

When the air conditioning unit 810 is in the first position P1, the first module 811 is exposed and the second module 813 is blocked by the cover 820. In this case, the air conditioning function based on the first module 811 is carried out, but the air conditioning function based on the second module 813 is not carried out. In a case where the first module 811 is the deodorizing module and the second module 813 is the perfuming module, only the deodorizing function is performed while the air conditioning unit 810 is in the first position P1.

When the air conditioning unit 810 is in the second position P2, the first module 811 is blocked by the cover 820 and the second module 813 is exposed. In this case, the air conditioning function based on the first module 811 is not carried out, but the air conditioning function based on the second module 813 is carried out. For example, only the perfuming function is performed while the air conditioning unit 810 is in the second position P2.

Meanwhile, when the air conditioning unit 810 is in the third position P3 between the first position P1 and the second position P2, both the first module 811 and the second module 813 are all covered with the cover 820. Because both the first module 811 and the second module 813 are not exposed, any air conditioning function of the first module 811 or the second module 813 is not carried out.

Below, an example in which a structure that both the first module 811 and the second module 813 are all blocked by the cover 820 is used will be described. The clothes-treating apparatus supplies steam to the chamber and increases the amount of water contained in clothes for various purposes of smoothing out wrinkles of the clothes, etc. However, when the first module 811 or the second module 813 is exposed while the steam is supplied, the exposed first module 811 or the exposed second module 813 is in contact with water caused by the steam. Therefore, the air conditioning function or life of the first module 811 or the second module 813 may be lowered by water.

In other words, the clothes-treating apparatus covers all the first module 811 and the second module 813 with the cover 820 while the steam operation or the like preset operation is performed, thereby securing the performance and life of the first module 811 or the second module 813.

Below, a method of controlling the clothes-treating apparatus with the foregoing structure will be described.

Figure 9:
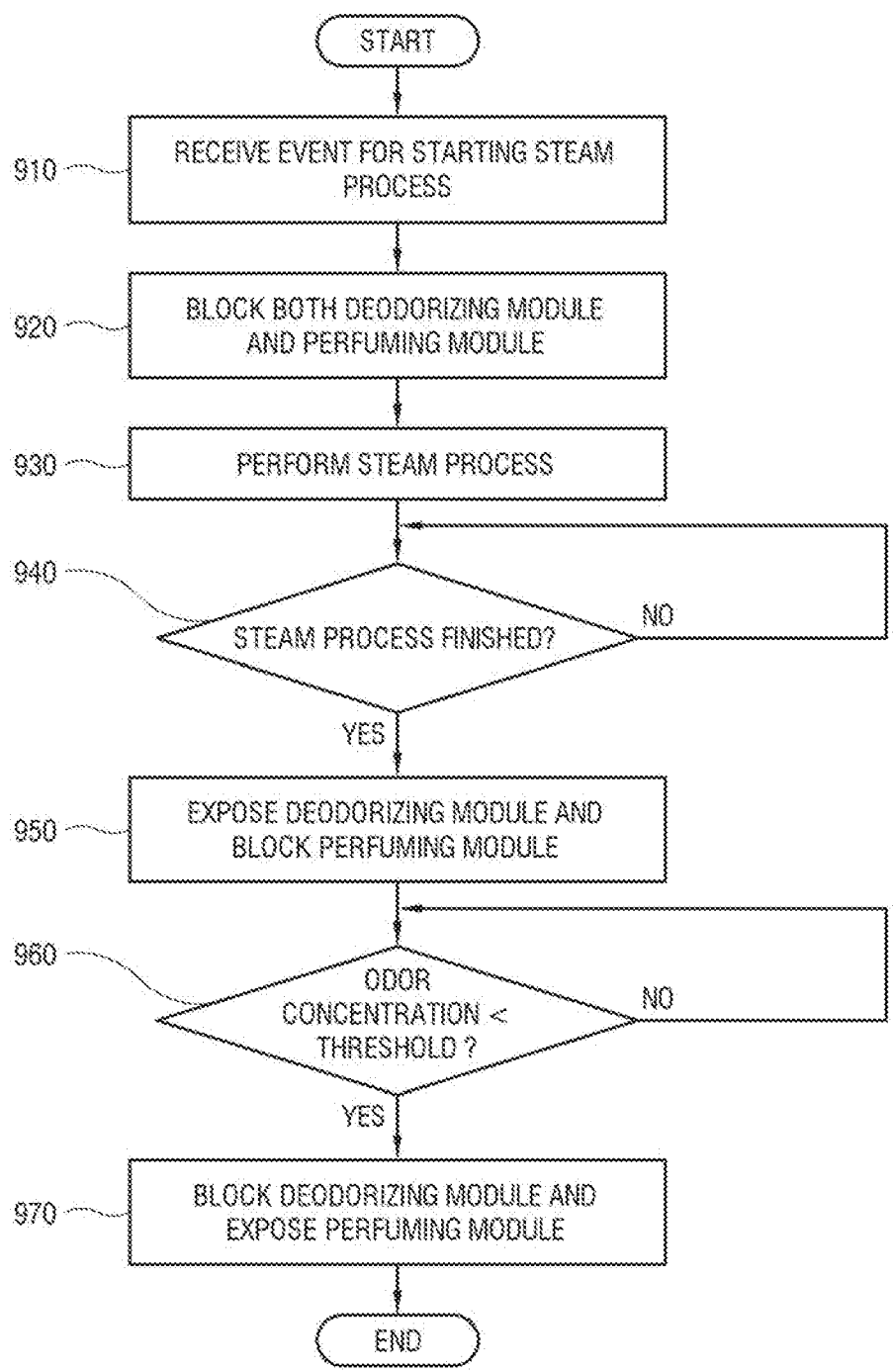
FIG. 9 is a flowchart of a control method in a clothes-treating apparatus according to an embodiment of the disclosure.

FIG. 9 is a flowchart of a control method in a clothes-treating apparatus according to an embodiment of the disclosure.

As shown in FIG. 9, the following operations are performed by the controller of the clothes-treating apparatus.

At operation 910 the clothes-treating apparatus receives an event for starting a steam process.

At operation 920 the clothes-treating apparatus blocks all the deodorizing module and the perfuming module in response to the received event.

At operation 930 the clothes-treating apparatus performs the steam process.

At operation 940 the clothes-treating apparatus identifies whether the steam process is finished. When the steam process is not finished, the clothes-treating apparatus continues to monitor whether the steam process is finished.

When it is identified that the steam process is finished, at operation 950 the clothes-treating apparatus exposes the deodorizing module and blocks the perfuming module.

At operation 960 the clothes-treating apparatus identifies whether the odor concentration in the chamber is lower than the threshold. When the odor concentration of the chamber is not lower than the threshold, the clothes-treating apparatus maintains the current status.

On the other hand, when the odor concentration of the chamber is lower than the threshold, at operation 970 the clothes-treating apparatus blocks the deodorizing module and exposes the perfuming module.

Thus, the exposed and blocked statuses of the modules are controlled based on the process and conditions of the clothes-treating apparatus.

The foregoing embodiment shows that the modules are selectively exposed or blocked by moving with respect to the stationary cover. However, the structure based on the concept of the disclosure is not limited to this embodiment. Below, an embodiment of a structure different from that of the foregoing embodiment will be described.

Figure 10:
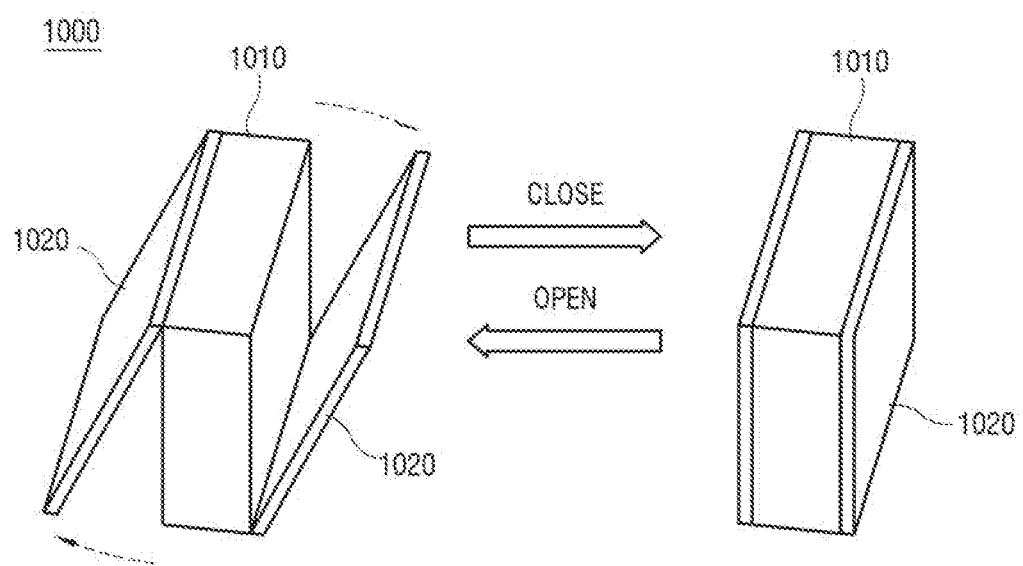
FIG. 10 is a perspective view showing a status change of a first module applied to a clothes-treating apparatus according to an embodiment of the disclosure.

FIG. 10 is a perspective view showing a status change of a first module applied to a clothes-treating apparatus according to an embodiment of the disclosure.

As shown in FIG. 10, the first module 1000 according to this embodiment is provided to pass air therethrough based on identification, and includes a first module main body 1010 for performing a predetermined air conditioning function, and first module covers 1020 rotatably coupled to the first module main body 1010 to selectively cover the plate surfaces of the first module main body 1010. The first module and the second module of the foregoing embodiment are coupled to each other in the air conditioning unit, whereas the first module 1000 and the second module in this embodiment are individually separated. In this embodiment, the structure of the second module is similar to that of the first module 1000, and therefore detailed descriptions thereof will be omitted.

The first module main body 1010 is shaped like a quadrangular plate, and has the surfaces corresponding to the largest area, on which the first module covers 1020 are disposed. The first module main body 1010 performs a predetermined first air conditioning function, for example, the deodorizing function. While the first module covers 1020 are taken off from the surfaces of the first module main body 1010, air enters the first module main body 1010 through one opened surface and comes out of the first module main body 1010 through the other opened surface. While passing through the first module main body 1010, air is deodorized by the first module main body 1010.

One pair of first module covers 1020 is provided to respectively cover the two largest and opposite surfaces among many surfaces of the first module main body 1010. One pair of first module covers 1020 may rotate between a closing position of covering the surfaces of the first module main body 1010 and an opening position of opening the surfaces of the first module main body. In the accompanying drawing, the left side shows that the first module covers 1020 are in the opening position, and the right side shows that the first module covers 1020 are in the closing position.

There may be various structures for coupling the first module covers 1020 to the first module main body 1010 and various methods of rotating the first module covers 1020. For example, a hinge structure may be used to couple the first module covers 1020 to the first module main body 1010. Further, the driving power of the motor installed in the clothes-treating apparatus may be transferred to the first module cover 1020 so that the first module cover 1020 can rotate.

In this case, when one first module cover 1020 is rotatably coupled to the upper edge of the first module main body 1010, the other first module cover 1020 is rotatably coupled to the lower edge of the first module main body 1010. Therefore, when the two first module covers 1020 are in the opening position, the first module main body 1010 and the two first module covers 1020 are disposed to have an "N" shape when viewed from one side. This is to secure a channel through which air moving from the lower side in the drawing can pass through the first module main body 1010 and move upward. If the two first module covers 1020 are all rotatably coupled to the upper edges of the first module main body 1010, air moving from the lower side in the drawing does not move upward but moves downward again because of the first module cover 1020.

Meanwhile, while the first module covers 1020 are in the closing position, the surfaces of the first module main body 1010 are closed by the first module covers 1020. Therefore, air moving from the lower side in the drawing cannot enter the first module main body 1010, but moves upward in the drawing passing by the first module cover 1020.

In other words, when the first module covers 1020 are provided to selectively close the surfaces for introducing air in the first module main body 1010, and the surfaces provided with the first module covers 1020 are disposed to be in parallel with an air blowing direction, air may be allowed to pass or prevented from passing through the first module main body 1010 according to the positions of the first module covers 1020.

With this structure, it will be described below that the first module 1000 and the second module are applied to the clothes-treating apparatus.

Figure 11:
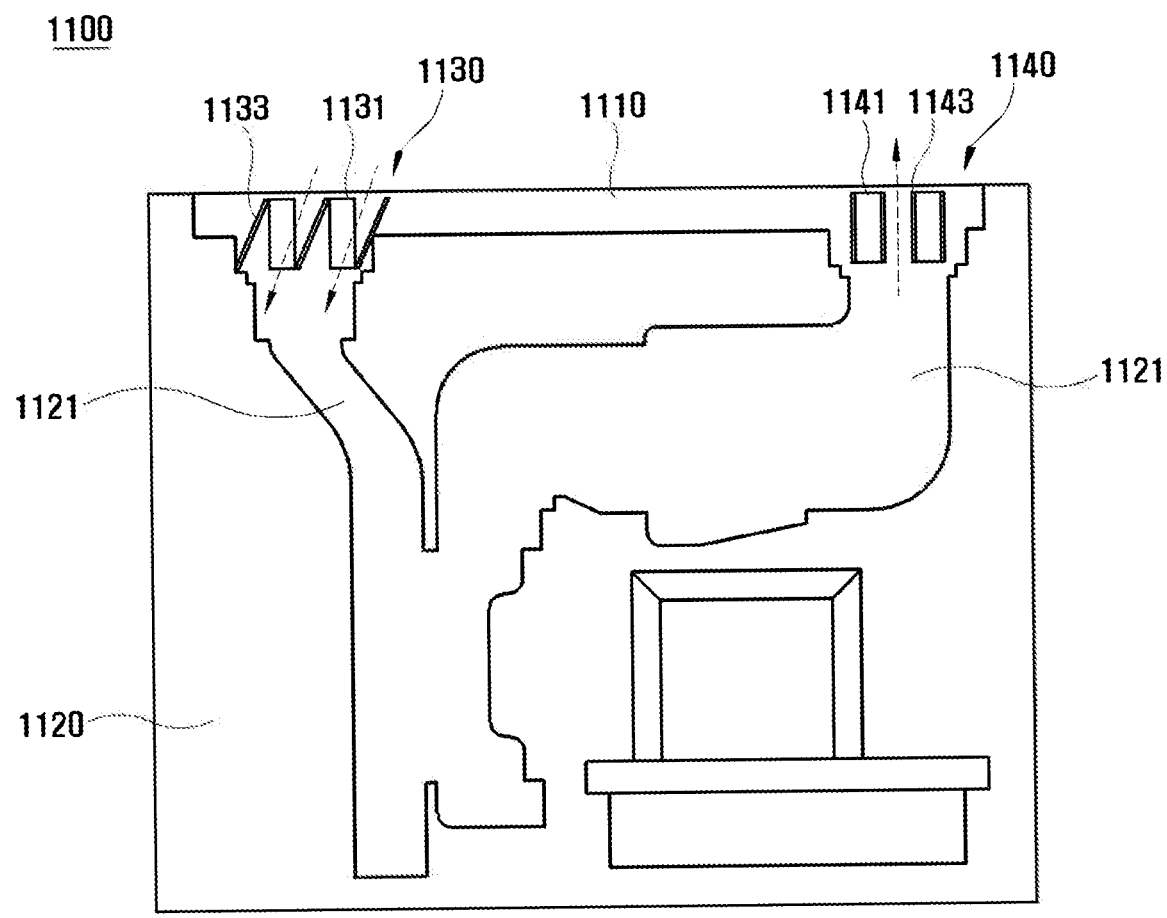
FIG. 11 is a lateral cross-section view showing that a first module and a second module are installed in a clothes-treating apparatus according to an embodiment of the disclosure.

FIG. 11 is a lateral cross-section view showing that a first module and a second module are installed in a clothes-treating apparatus according to an embodiment of the disclosure.

As shown in FIG. 11, a machinery room 1120 for supplying air to a chamber 1110 or discharging air from the chamber 1110 is placed below the chamber 1110 of a clothes-treating apparatus 1100. A channel 1121 inside the machinery room 1120 communicates with the air inlet and the air outlet on the bottom of the chamber 1110, thereby circulating air between the chamber 1110 and the machinery room 1120. The positions and functions of the air inlet and the air outlet are the same as those described above in the foregoing embodiments.

The clothes-treating apparatus 1100 includes a first module 1130 placed at a first position on the channel 1121, and a second module 1140 separated from the first module 1130 and placed at a second position on the channel 1121. In this embodiment, the first position corresponds to the air inlet and the second position corresponds to the air outlet. However, the first position and the second position may correspond to any positions on the channel 1121.

The first module 1130 includes a first module main body 1131, and first module covers 1133 provided to selectively open and close the surfaces of the first module main body 1131. Likewise, the second module 1140 includes a second module main body 1141, and second module covers 1143 provided to selectively open and close the surfaces of the second module main body 1141. The structures of the first module 1130 and the second module 1140 are the same as those described above in the foregoing embodiment.

In the accompanying drawing, the first module 1130 has a status that the first module covers 1133 are in the opening position. In other words, the first module covers 1133 are rotated so that air moving from the chamber 1110 to the channel 1121 can be guided toward the first module main body 1131. Air is guided by the first module covers 1133 to pass through the first module main body 1131, and then moves through the channel 1121.

On the other hand, the second module 1140 has a status that the second module covers 1143 are in the closing position. The second module cover 1143 does not interfere with the channel 1121, so that air moving through the channel 1121 can pass by the second module 1140 and enter the chamber 1110. Because the second module main body 1141 is closed by the second module covers 1143, air cannot enter the second module main body 1141.

Thus, the clothes-treating apparatus 1100 prevents the second module 1140 from carrying out the second air conditioning function while the first module 1130 carries out the first air conditioning function.

Further, the same principle is also applied when the first module covers 1133 are the closing position and the second module covers 1143 are in the opening position. In this case, the second module 1140 carries out the second air conditioning function while the first module 1130 does not carry out the first air conditioning function.

Meanwhile, all the first module covers 1133 and the second module covers 1143 may be in the closing position. In this case, both the first air conditioning function and the second air conditioning function are not performed, and therefore the clothes-treating apparatus 1100 may operate like this for the steam process or the like special process.

The foregoing embodiment shows that the air conditioning unit is placed on the channel or the like of the clothes-treating apparatus 1100. Alternatively, the air conditioning unit may be placed in the clothes hanger on which clothes are hung in the chamber, so that the air conditioning function for the clothes can be doubled. Below, such an embodiment will be described.

Figure 12:
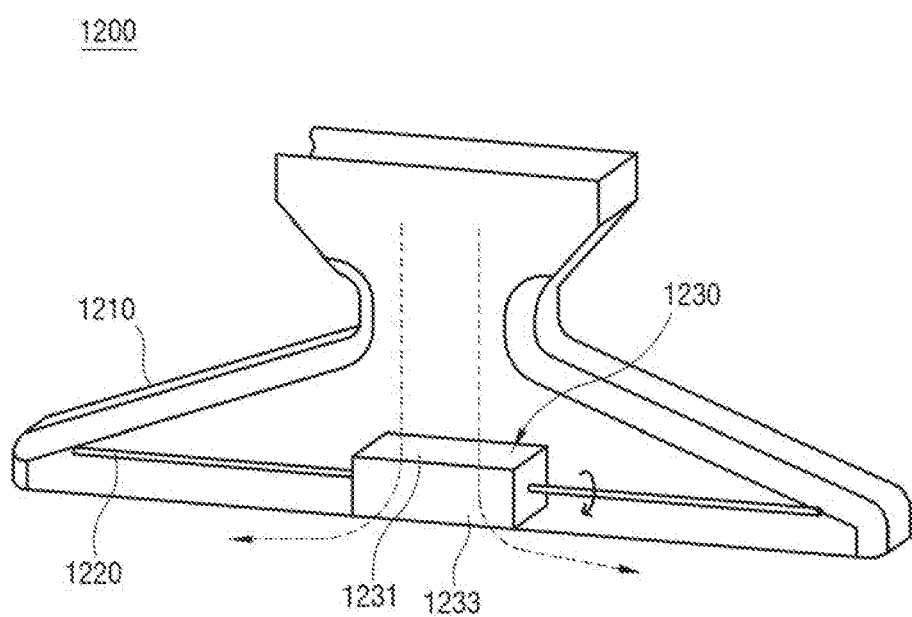
FIG. 12 is a perspective view of a clothes hanger applied to a clothes-treating apparatus according to an embodiment of the disclosure.

FIG. 12 is a perspective view of a clothes hanger applied to a clothes-treating apparatus according to an embodiment of the disclosure.

As shown in FIG. 12, a clothes hanger 1200, on which a piece of clothing is hung, is provided to be hung on the hanger at the upper side of the chamber in the clothes-treating apparatus. The clothes hanger 1200 includes a clothes hanger main body 1210 internally formed with a channel, a rotary shaft 1220 disposed in the channel inside the clothes hanger main body 1210, and an air conditioning unit 1230 rotatably coupled to the rotary shaft 1220.

The clothes hanger main body 1210 has a top side and a bottom side which communicate with the internal channel. Air ascending from the lower side of the chamber moves from the top side the clothes hanger main body 1210 to the internal channel of the clothes hanger main body 1210, and moves from the bottom side of the clothes hanger main body 1210 to the lower side of the chamber.

The air conditioning unit 1230 is rotatably provided on the internal channel of the clothes hanger main body 1210. The air conditioning unit 1230 includes a first module 1231, and a second module 1233 disposed to be substantially perpendicular to the first module 1231. The air conditioning unit 1230 is provide to rotate with respect to the rotary shaft 1220, between a first position in which the surface of the first module 1231 is disposed to be perpendicular to the channel and the surface of the second module 1233 is disposed to be in parallel with the channel, and a second position in which the surface of the first module 1231 is disposed to be in parallel with the channel and the surface of the second module 1233 is disposed to be perpendicular to the channel. Such rotation of the air conditioning unit 1230 may be manually performed by a user, or may be performed by a driver provided in the clothes hanger main body 1210 according to various structures.

While the air conditioning unit 1230 is in the first position, air moving through the channel passes through the first module 1231 but substantially passes by the second module 1233, thereby carrying out the first air conditioning function of the first module 1231. On the other hand, while the air conditioning unit 1230 is in the second position, air moving through the channel substantially passes by the first module 1231 but passes through the second module 1233, thereby carrying out the second air conditioning function of the second module 1233.

Thus, it is possible to more improve the air conditioning function for the clothes hung on the clothes hanger 1200.

As described above in the foregoing embodiments, it is efficient that the air conditioning unit is placed on the channel of the machinery room. However, the air conditioning unit is not necessarily placed on the channel. Below, a structure that the air conditioning unit is placed not on the channel of the machinery room but on the wall of the chamber will be described.

Figure 13:
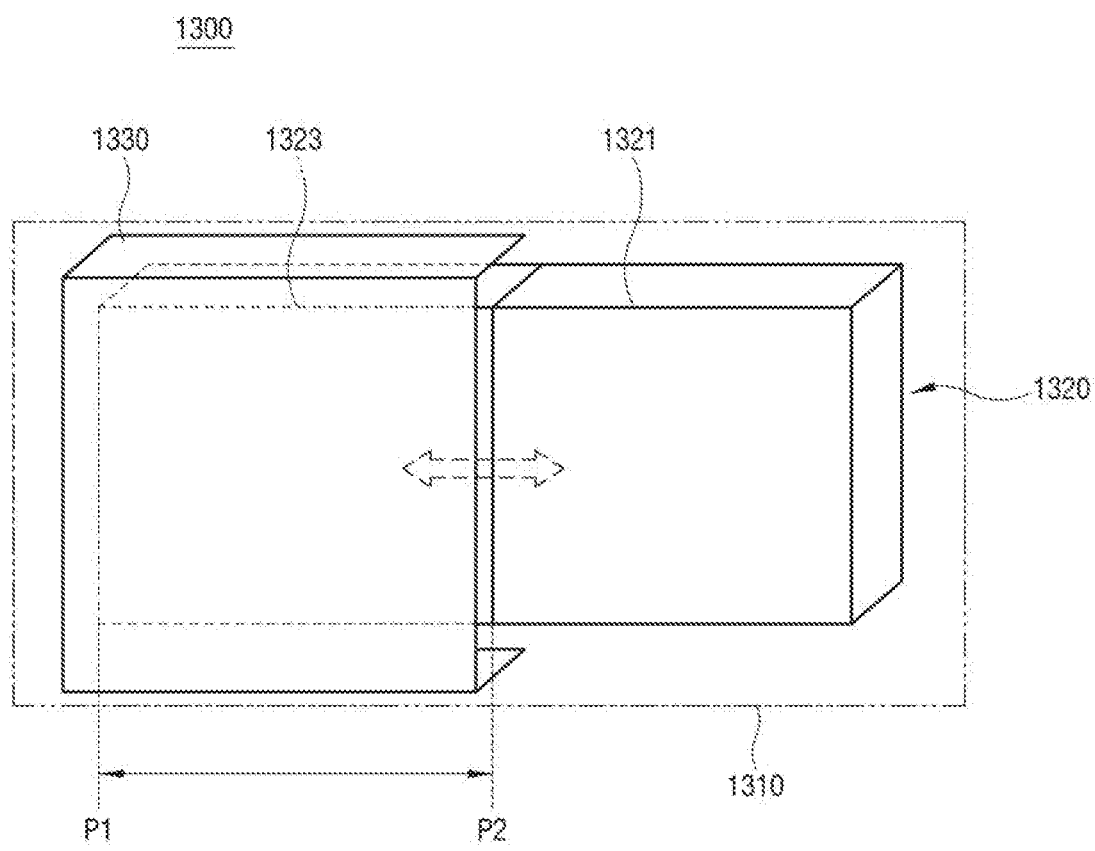
FIG. 13 is a perspective view of an air conditioning unit installed in a clothes-treating apparatus according to an embodiment of the disclosure.

FIG. 13 is a perspective view of an air conditioning unit installed in a clothes-treating apparatus according to an embodiment of the disclosure.

As shown in FIG. 13, a clothes-treating apparatus 1300 includes a chamber 1310, and an air conditioning unit 1320 placed on the wall of the chamber 1310. The air conditioning unit 1320 includes a first module 1321, a second module 1323 disposed side by side with the first module 1321, and a cover 1330 movably provided to selectively cover at least one of the first module 1321 and the second module 1323.

The cover 1330 is provided on the wall of the chamber 1310, and movable within a predetermined section. There are no limits to the movable structure of the cover 1330. For example, the cover 1330 may be moved by the driving power of the motor installed in the clothes-treating apparatus 1300. The movement of the cover 1330 may be carried out by the controller of the clothes-treating apparatus 1300.

The cover 1330 moves sliding between a first position P1 to expose the first module 1321 and block the second module 1323, and a second position P2 to block the first module 1321 and expose the second module 1323. Thus, the cover 1330 can selectively expose the first module 1321 and the second module 1323 according to preset conditions.

This embodiment shows that the cover 1330 blocks only one of the first module 1321 and the second module 1323. However, the cover 1330 may be designed to have a structure for blocking both the first module 1321 and the second module 1323. For example, the width of the cover 1330 may be large enough to cover all the first module 1321 and the second module 1323. In this case, the cover 1330 may move between the first position to expose the first module 1321 and block the second module 1323, the second position to block the first module 1321 and expose the second module 1323, and a third position to block both the first module 1321 and the second module 1323.

When the air conditioning unit is placed on the wall of the chamber, various structures are possible. Below, another structure for the air conditioning unit will be described.

Figure 14:
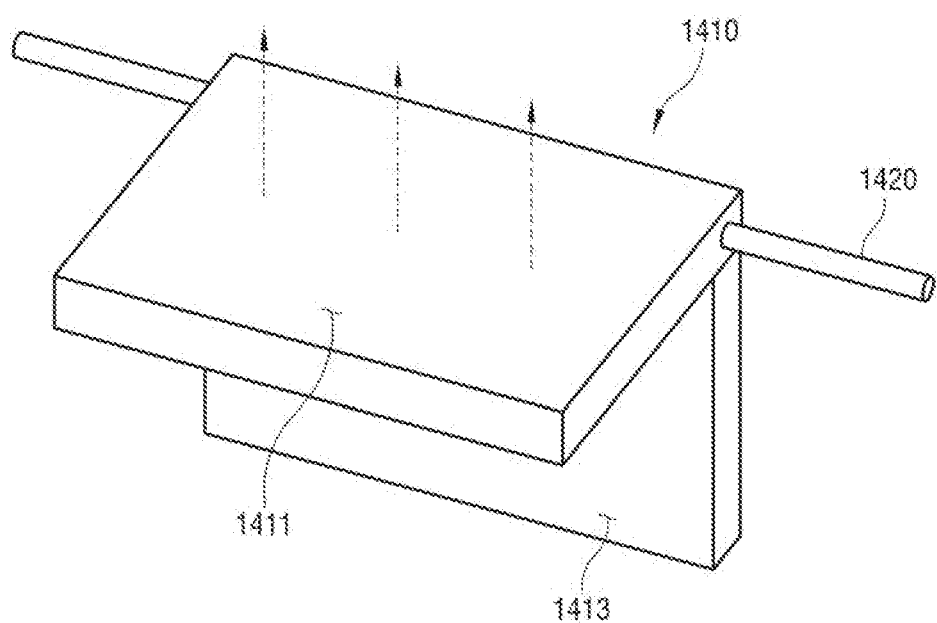
FIG. 14 is a perspective view showing a structure of an air conditioning unit according to an embodiment of the disclosure.

FIG. 14 is a perspective view showing a structure of an air conditioning unit according to an embodiment of the disclosure.

As shown in FIG. 14, an air conditioning unit 1410 includes a first module 1411, and a second module 1413 perpendicular to the first module 1411. The air conditioning unit 1410 is rotatably supported on a rotary shaft 1420 supported in the chamber. The rotation of the air conditioning unit 1410 around the rotary shaft 1420 is carried out by the driving power of the motor installed in the clothes-treating apparatus, and the motor is driven by the controller of the clothes-treating apparatus. Alternatively, the air conditioning unit 1410 may be rotated by a user without any separate rotating structure.

The air conditioning unit 1410 is provided to rotate between a first position in which the surface of the first module 1411 is perpendicular to an air moving direction and the surface of the second module 1413 is in parallel with the air moving direction, and a second position in which the surface of the first module 1411 is in parallel with the air moving direction and the surface of the second module 1413 is perpendicular to the air moving direction. When the air conditioning unit 1410 is placed on the wall of the chamber, air moves upward or downward. In other words, the air moving direction is one of the ascending and descending directions.

When the air conditioning unit 1410 is in the first position, air passes through the surface of the first module 1411 and thus undergoes the first air conditioning function. On the other hand, when the air conditioning unit 1410 is in the second position, air passes through the surface of the second module 1413 and thus undergoes the second air conditioning function. Like this, the air conditioning unit 1410 is rotated to be in either of the first position or the second position, so that one of the first air conditioning function and the second air conditioning function can be selectively performed.

In the foregoing embodiments, the air conditioning unit is applied to the clothes-treating apparatus. However, the apparatus to which the air conditioning unit according to the concept of the disclosure is applied is not limited to the clothes-treating apparatus. Below, it will be described that the air conditioning unit is used as applied to various kinds of apparatuses.

In a washing machine or a drying machine having a function of cleaning clothes, a function of deodorizing the clothes is also important. Further, a consumer may use a fabric softener or the like to perfume clothes with a desired aroma, and thus the perfuming may be artificially performed in the washing machine or the like. Therefore, the washing machine or the drying machine performs a deodorizing process to remove an unpleasant odor from the clothes at initial operation stage, and then enters a perfuming process to thereby neutralize the unpleasant odor incompletely removed in the deodorizing process.

A refrigerator is basically provided with a deodorizing filter to remove various smells of food stored therein. However, a human has a sense of smell to smell odor gas of which concentration is very low in units of several parts per billion (ppb), and therefore it is not easy to completely deodorize the refrigerator even though the deodorizing filter removes gas components of food smells by a predetermined amount or higher. Accordingly, when the odor gas concentration is lowered down to a preset level or lower, the refrigerator is switched over from the deodorizing process to a perfuming process. Thus, the refrigerator can more effectively remove smells of food.

An oven or the like cooking device puts food therein like the refrigerator, but may smell more strongly than the refrigerator due to a cooking process. For example, the smell of roasting meat or fish, the smell of boiling stew, etc. are relatively strong. Therefore, high deodorizing performance is needed to remove such smells, and only the deodorizing function is insufficient to have such effects within a short time. Accordingly, the deodorizing process and the perfuming process are alternately performed in the oven. For example, the oven performs the deodorizing with regard to initial strong smells, performs the perfuming to neutralize the smells to some extent, and performs the deodorizing again, thereby effectively removing the smells.

An air conditioner, an air cleaner or the like air conditioning device also basically needs the deodorizing function and the like air conditioning functions. When the odor concentration in a surrounding space is excessively high, only the deodorizing function is insufficient to have a high deodorizing efficiency and the life of the deodorizing filter is also shortened. Further, when offensive odor gas components are excessively adsorbed to the deodorizing filter, this may become a new cause of offensive odor. Therefore, the air conditioning device is provided to alternately perform the deodorizing process and the perfuming process, thereby more efficiently removing an unpleasant smell and lengthening the life of the deodorizing filter.

The invention claimed is:

1. A clothes-treating apparatus comprising:
   a housing having an accommodating space to accommodate clothes therein;
   a cover;
   a first air conditioning module to adjust a first condition of air in the accommodating space, and
   a second air conditioning module to adjust a second condition, different from the first condition, of air in the accommodating space,
   wherein the first air conditioning module and the second air conditioning module are configured to be movable to
      a first positional configuration in which the second air conditioning module is in a blocked position in which the second air conditioning module is blocked by the cover so that the second condition of air in the accommodating space is not adjustable by the second air conditioning module, and the first air conditioning module is in an exposed position in which the first air conditioning module is not blocked, and is thereby exposed, by the cover so that the first condition of air in the accommodating space is adjustable by the first air conditioning module, and
      a second positional configuration in which the first air conditioning module is in a blocked position in which the first air conditioning module is blocked by the cover so that the first condition of air in the accommodating space is not adjustable by the first air conditioning module, and the second air conditioning module is in an exposed position in which the second air conditioning module is not blocked, and is thereby exposed, by the cover so that the second condition of air in the accommodating space is adjustable by the second air conditioning module.

2. The clothes-treating apparatus according to claim 1, further comprising:
   a driver configured to drive the first air conditioning module and the second air conditioning module, to thereby move the first air conditioning module and the second air conditioning module; and
   a controller configured to control the driver to control movement of the first air conditioning module and the second air conditioning module to a positional configuration of the first positional configuration and the second positional configuration.

3. The clothes-treating apparatus according to claim 2, further comprising:
   a channel in the housing to introduce or discharge air into or from the accommodating space,
   wherein the first air conditioning module is disposed on the channel when in the first positional configuration, and the second air conditioning module is disposed on the channel when in the second positional configuration.

4. The clothes-treating apparatus according to claim 2, further comprising:
   a sensor configured to detect odor concentration inside the accommodating space,
   wherein the controller is configured to control the driver to control movement of the first air conditioning module and the second air conditioning module to a positional configuration of the first positional configuration and the second positional configuration based on whether the odor concentration detected by the sensor is higher than a threshold.

5. The clothes-treating apparatus according to claim 2, further comprising:
   a timer configured to measure time,
   wherein the controller is configured to control the driver to control movement of the first air conditioning module and the second air conditioning module to a positional configuration of the first positional configuration and the second positional configuration based on whether the time measured by the timer has reached a preset time.

6. The clothes-treating apparatus according to claim 2, wherein
the first air conditioning module and the second air conditioning module are configured to be movable to a third positional configuration in which the first air conditioning module is in a blocked position in which the first air conditioning module is blocked by the cover so that the first condition of air in the accommodating space is not adjustable by the first air conditioning module, and the second air conditioning module is in a blocked position in which the second air conditioning module is blocked by the cover so that the second condition of air in the accommodating space is not adjustable by the second air conditioning module, and
the controller is configured to control the driver to control movement of the first air conditioning module and the second air conditioning module to a positional configuration of the first positional configuration, the second positional configuration, and the third positional configuration.

7. The clothes-treating apparatus according to claim 1, wherein
the housing includes an inlet to introduce air into the accommodating space, and an outlet to discharge air from the accommodating space,
the first air conditioning module includes a deodorizing module to perform a deodorizing function as an adjustment of the first condition, and the second air conditioning module includes a perfuming module to perform a perfuming function as an adjustment of the second condition, and
the first air conditioning module is disposed on the inlet when the first air conditioning module and the second air conditioning module are in the first positional configuration, and the second air conditioning module is disposed on the outlet when the first air conditioning module and the second air conditioning module are in the second positional configuration.

8. The clothes-treating apparatus according to claim 1, further comprising:
a rotary shaft to which the first air conditioning module and the second air conditioning module are coupled;
a driver configured to drive the rotary shaft to rotate; and
a controller configured to control the driver to drive the rotary shaft to move the first air conditioning module and the second air conditioning module to be in one of the first positional configuration and the second positional configuration.

9. The clothes-treating apparatus according to claim 1, wherein
the first air conditioning module includes a deodorizing module to perform a deodorizing function as an adjustment of the first condition, and the second air conditioning module includes a perfuming module to perform a perfuming function as an adjustment of the second condition, and
the clothes-treating apparatus further includes:
a sensor configured to detect odor concentration inside the accommodating space; and
a controller configured to control the first air conditioning module and the second air conditioning module to be in the first positional configuration based on the odor concentration detected by the sensor being higher than a threshold.

10. The clothes-treating apparatus according to claim 9, further comprising:
a steam supplier configured to supply steam to the accommodating space, wherein
the first air conditioning module and the second air conditioning module are configured to be movable to a third positional configuration in which the first air conditioning module is in a blocked position in which the first air conditioning module is blocked by the cover so that the first condition of air in the accommodating space is not adjustable by the first air conditioning module, and the second air conditioning module is in a blocked position in which the second air conditioning module is blocked by the cover so that the second condition of air in the accommodating space is not adjustable by the second air conditioning module, and
the controller is configured to control the first air conditioning module and the second air conditioning module to be in the third positional configuration while the steam supplier is supplying steam.

11. The clothes-treating apparatus according to claim 1, wherein the first air conditioning module and the second air conditioning module are configured to be movable to a third positional configuration in which the first air conditioning module is in a blocked position in which the first air conditioning module is blocked by the cover so that the first condition of air in the accommodating space is not adjustable by the first air conditioning module, and the second air conditioning module is in a blocked position in which the second air conditioning module is blocked by the cover so that the second condition of air in the accommodating space is not adjustable by the second air conditioning module.

* * * * *